(12) United States Patent
Capelli et al.

(10) Patent No.: US 11,760,138 B2
(45) Date of Patent: Sep. 19, 2023

(54) TIRE INFLATION VALVE EQUIPPED WITH ADJUSTING SYSTEM FOR A TPMS SENSOR

(71) Applicant: WONDER S.P.A., Cremona (IT)

(72) Inventors: Andrea Capelli, Cremona (IT); Stefano Cazzanti, Cremona (IT); Giancarlo Galli, Cremona (IT)

(73) Assignee: WONDER S.P.A., Cremona (IT)

( * ) Notice: Subject to any disclaimer, the term of this patent is extended or adjusted under 35 U.S.C. 154(b) by 65 days.

(21) Appl. No.: 17/483,057

(22) Filed: Sep. 23, 2021

(65) Prior Publication Data

US 2023/0091982 A1 Mar. 23, 2023

(51) Int. Cl.
*B60C 23/04* (2006.01)
*B60C 23/00* (2006.01)

(52) U.S. Cl.
CPC .... *B60C 23/0494* (2013.01); *B60C 23/00345* (2020.05); *B60C 23/00354* (2020.05)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0462; B60C 23/0411; B60C 23/20; B60C 23/0444; B60C 23/0479; B60C 11/24; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066;
(Continued)

(56) References Cited

U.S. PATENT DOCUMENTS

2009/0007649 A1* 1/2009 Kempf ................ B60C 23/0408
                                                             73/146.8
2010/0064791 A1* 3/2010 Chuang ............... B60C 23/0494
                                                             73/146.8
(Continued)

FOREIGN PATENT DOCUMENTS

CN       201769634 U    *  3/2011
CN       102259566 A    * 11/2011
(Continued)

OTHER PUBLICATIONS

Extended Search Report, Issued in 21176020.2, dated Dec. 15, 2021.

*Primary Examiner* — Andre J Allen
(74) *Attorney, Agent, or Firm* — Ferguson Case Orr Paterson

(57) ABSTRACT

A tire inflation valve associable with a tire pressure monitoring system (TPMS) sensor includes a stem ending in a head equipped with a head body and an adjustable insert associable with the TPMS sensor by a connection element and hinged to the head body to rotate about a transverse axis and allow position adjustment of the TPMS sensor. The adjustable insert allows modifying inclination of the TPMS sensor according to different use conditions.

13 Claims, 18 Drawing Sheets

(58) Field of Classification Search
CPC .......... B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC ................................................ 73/146–146.8
See application file for complete search history.

(56) References Cited

U.S. PATENT DOCUMENTS

| | | | |
|---|---|---|---|
| 2012/0017672 A1* | 1/2012 | Uh ........................ | B60C 29/064 |
| | | | 73/146.8 |
| 2014/0318231 A1 | 10/2014 | Lo | |
| 2017/0267038 A1 | 9/2017 | Li et al. | |
| 2020/0039302 A1 | 2/2020 | Mieyan et al. | |
| 2022/0016945 A1* | 1/2022 | Weston ................. | B60C 29/005 |

FOREIGN PATENT DOCUMENTS

| | | | | |
|---|---|---|---|---|
| CN | 202186246 U | * | 4/2012 | |
| CN | 202186247 | | 4/2012 | |
| CN | 103317980 | | 9/2013 | |
| EP | 1914093 | | 4/2008 | |
| EP | 2857230 B1 | * | 6/2016 | ......... B60C 23/0452 |
| EP | 3178675 | | 6/2017 | |
| EP | 3532318 B1 | * | 6/2021 | ......... B60C 23/0494 |
| FR | 3058360 | | 5/2018 | |
| JP | 4423225 B2 | * | 3/2010 | ........... B60C 23/003 |
| WO | WO-2020114792 A1 | * | 6/2020 | ......... B60C 23/0408 |
| WO | WO-2021171577 A1 | * | 9/2021 | ........... B60C 29/005 |

* cited by examiner

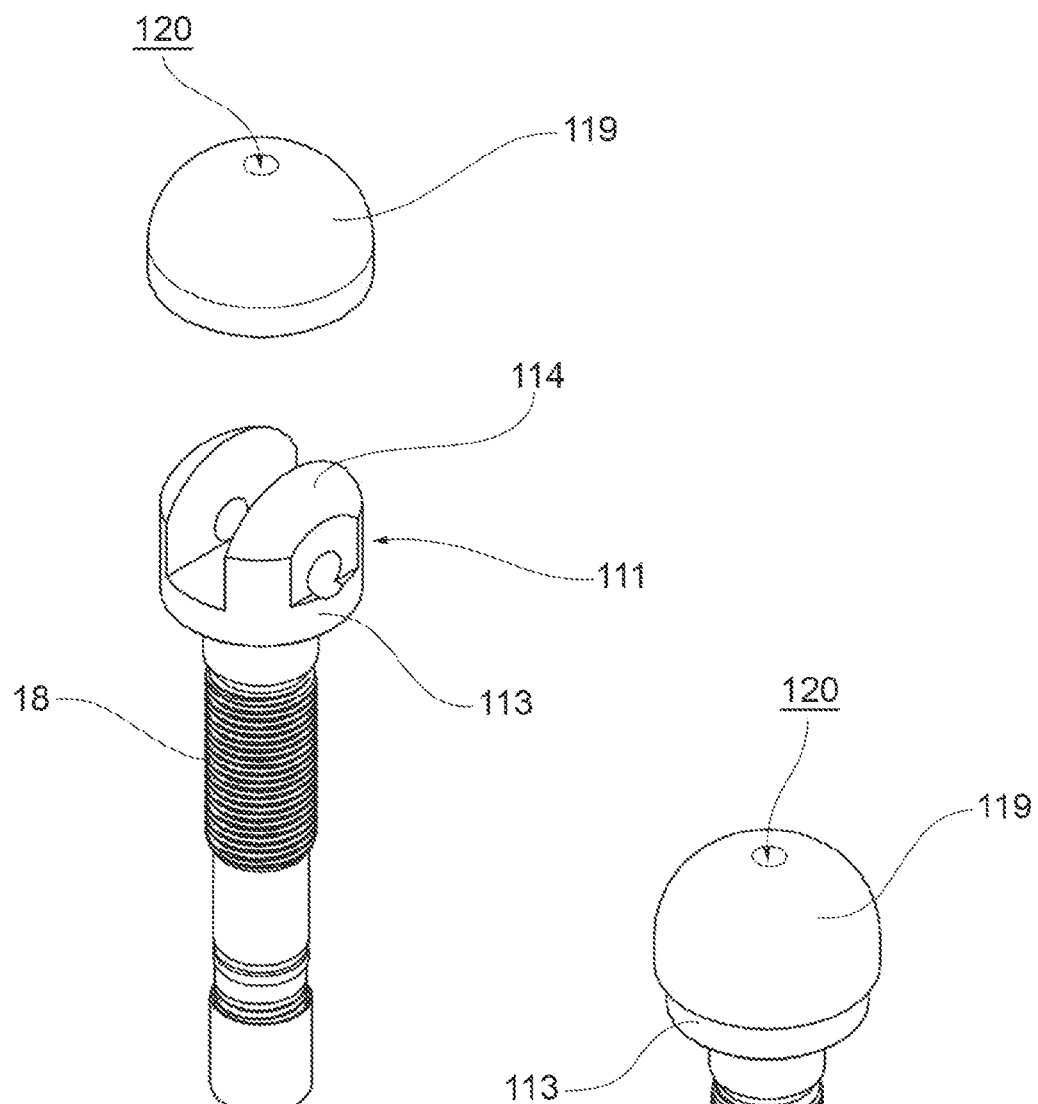
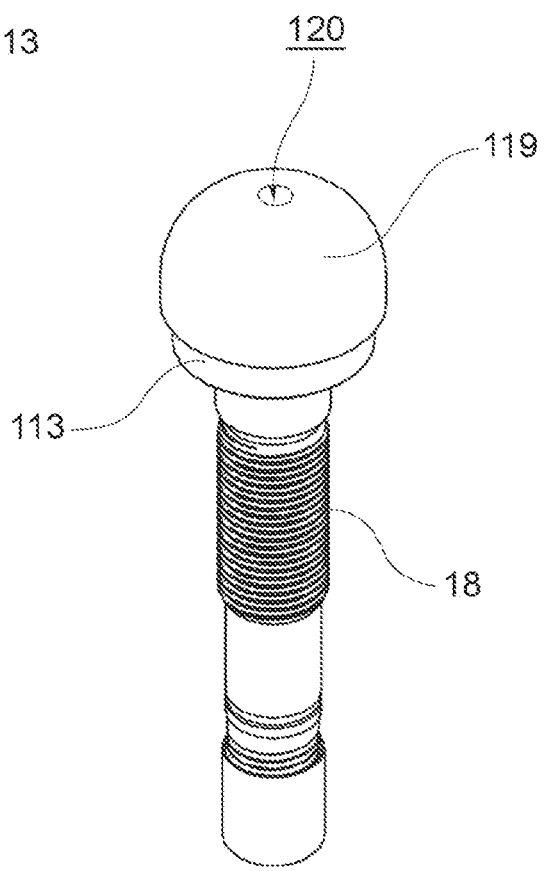
FIG.5a
FIG.5b

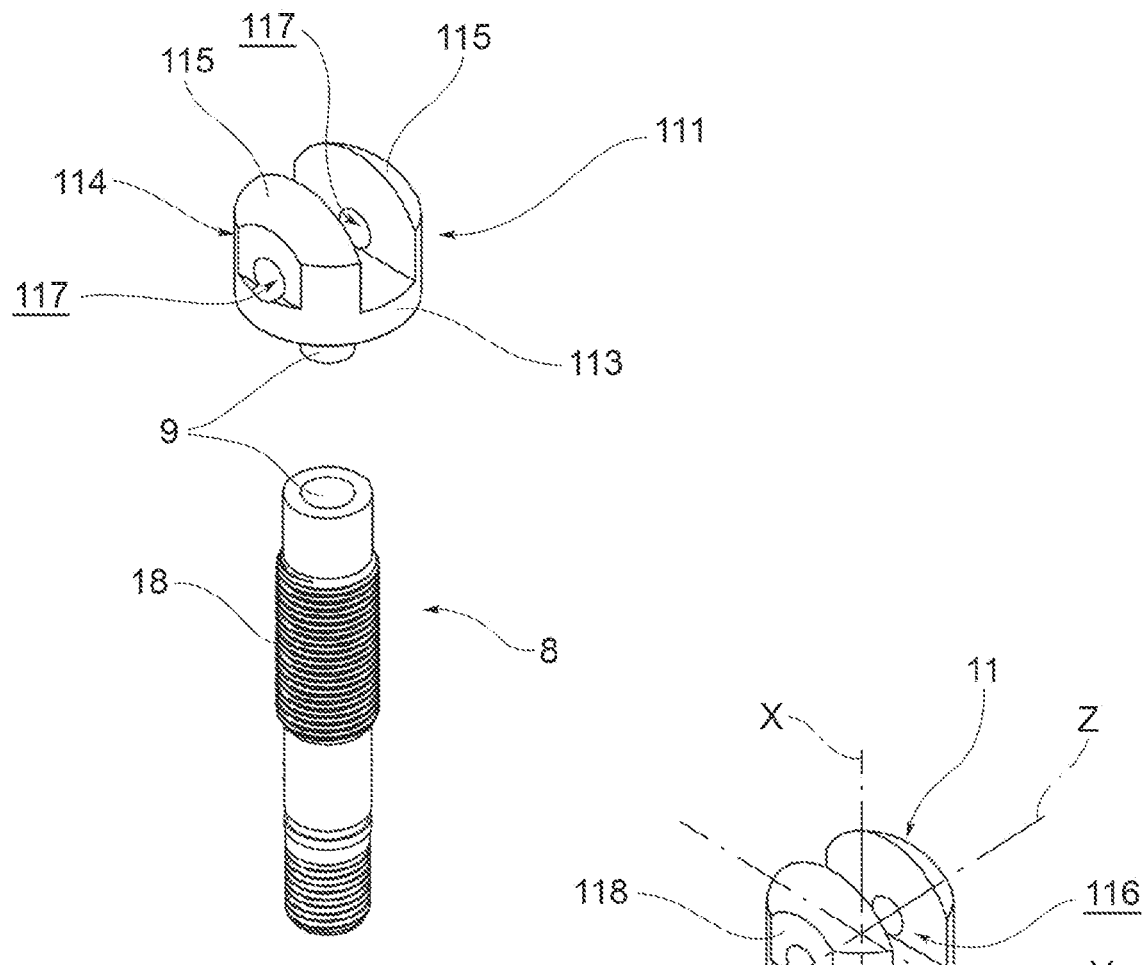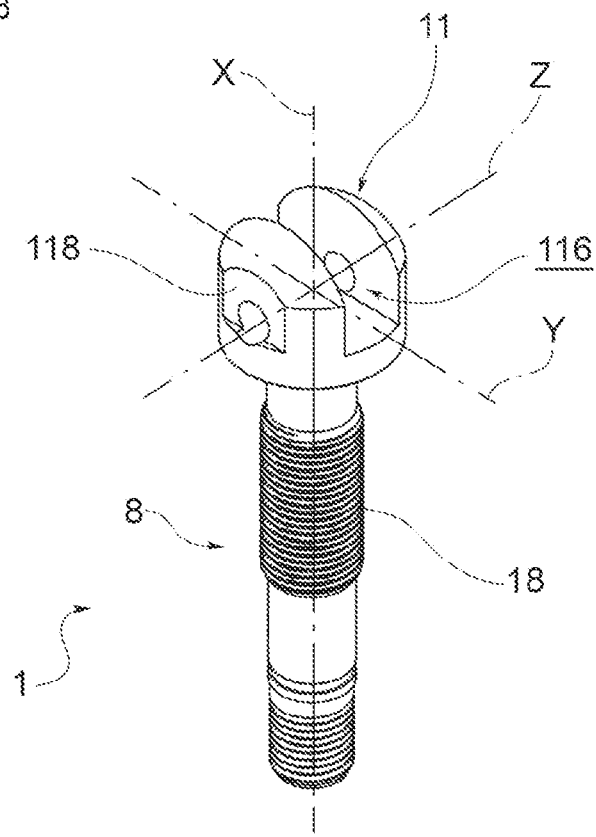
FIG.6a
FIG.6b

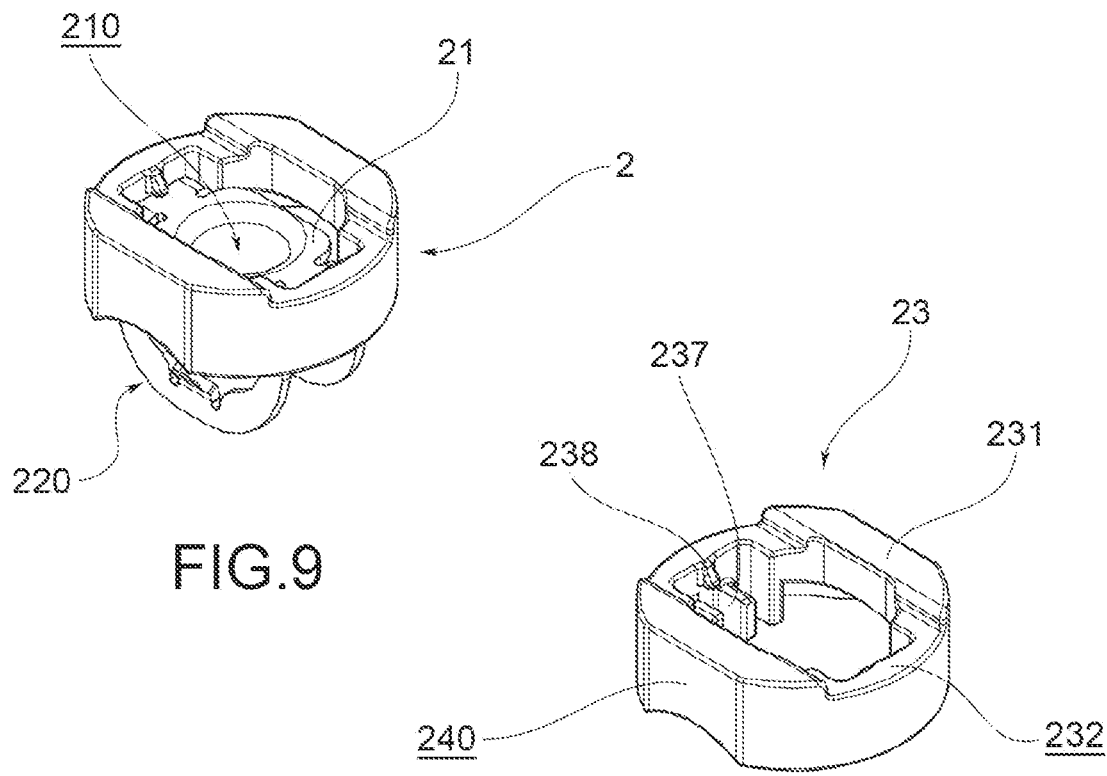
FIG.9
FIG.11
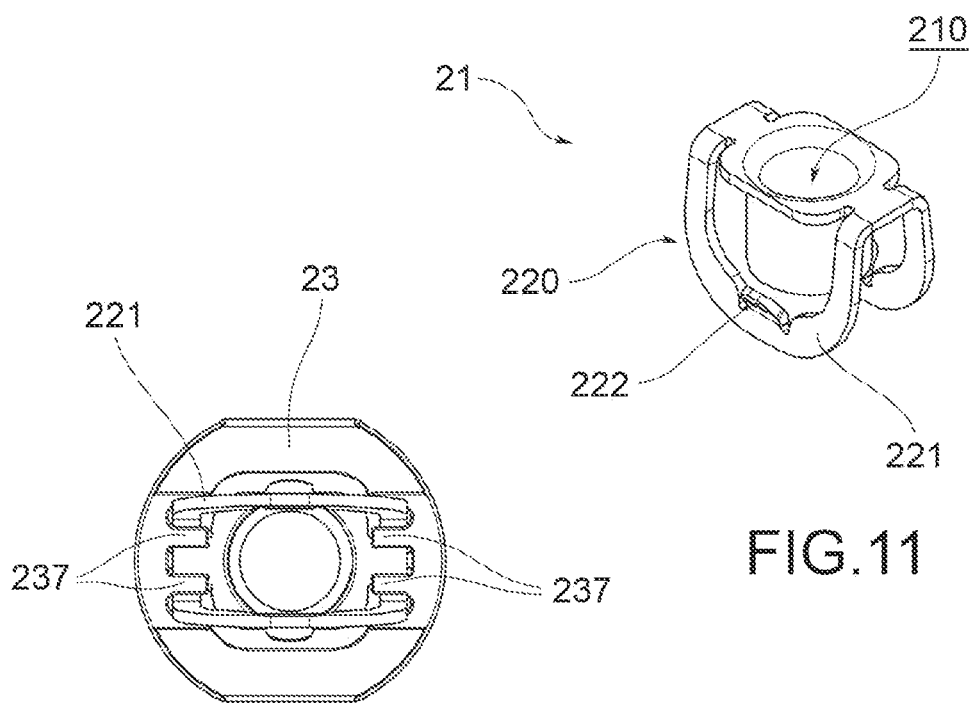
FIG.10a

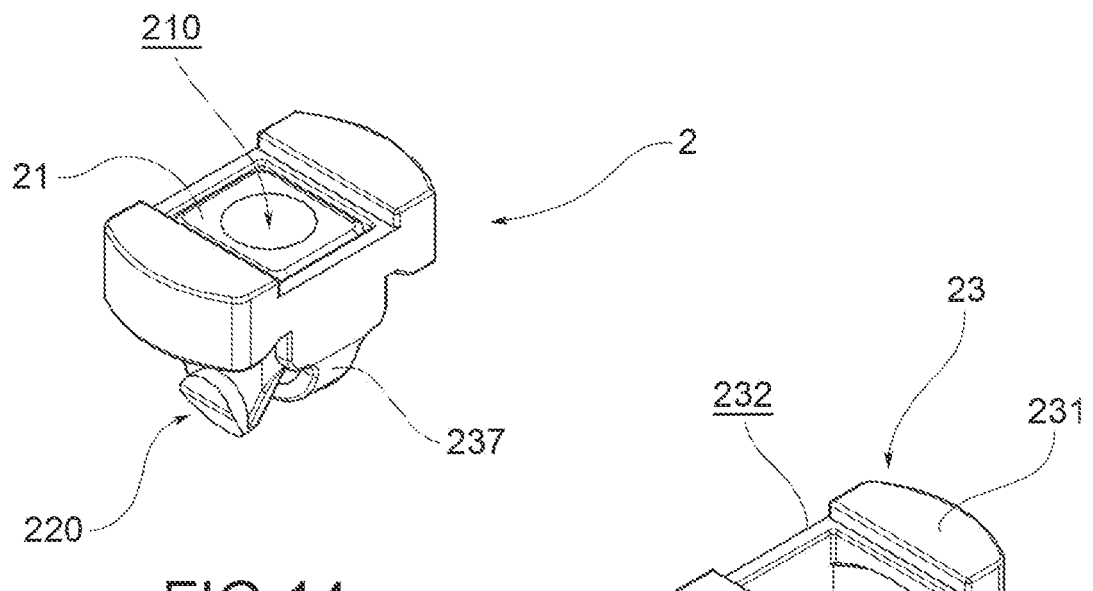
FIG.14
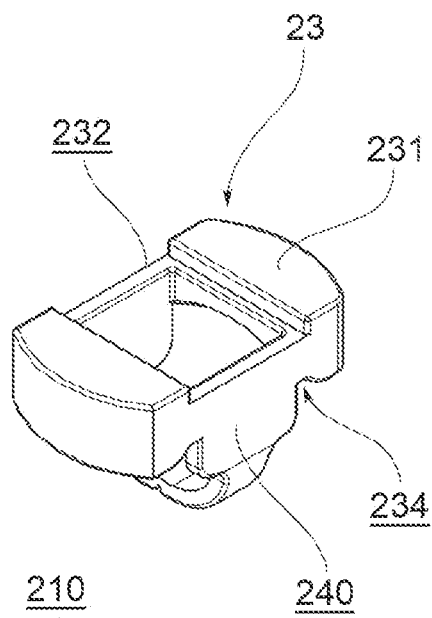
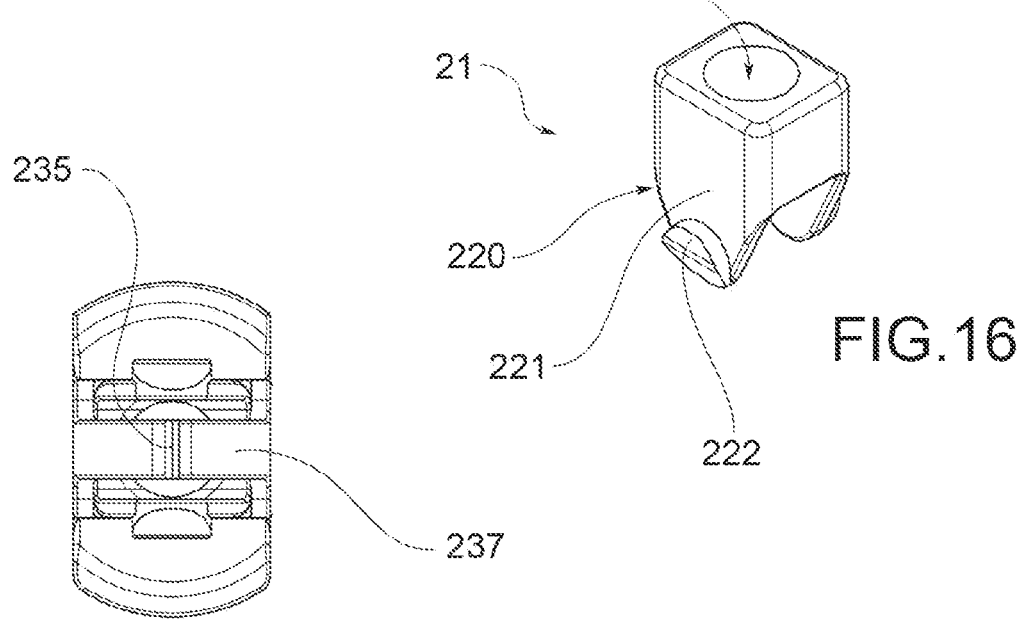
FIG.15a
FIG.16

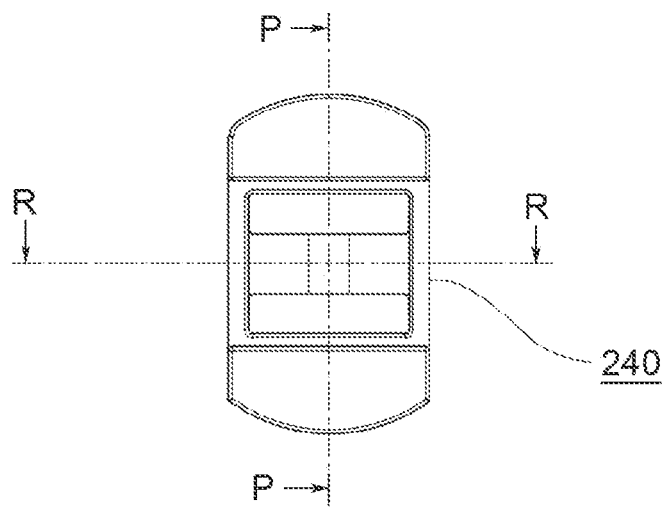
FIG.17
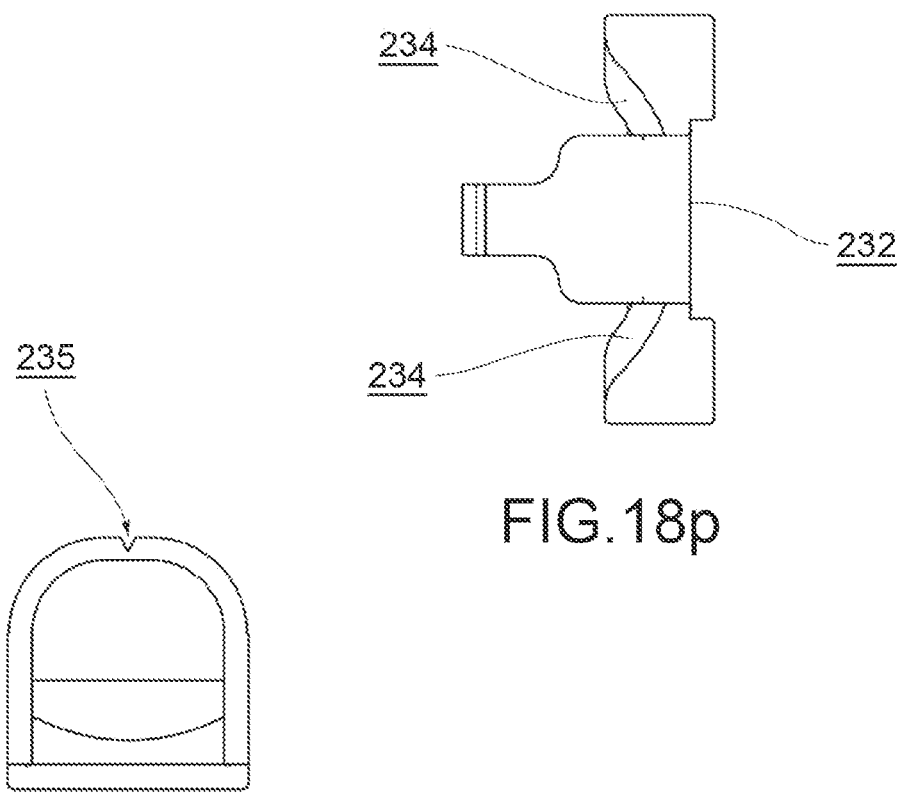
FIG.18p
FIG.18r

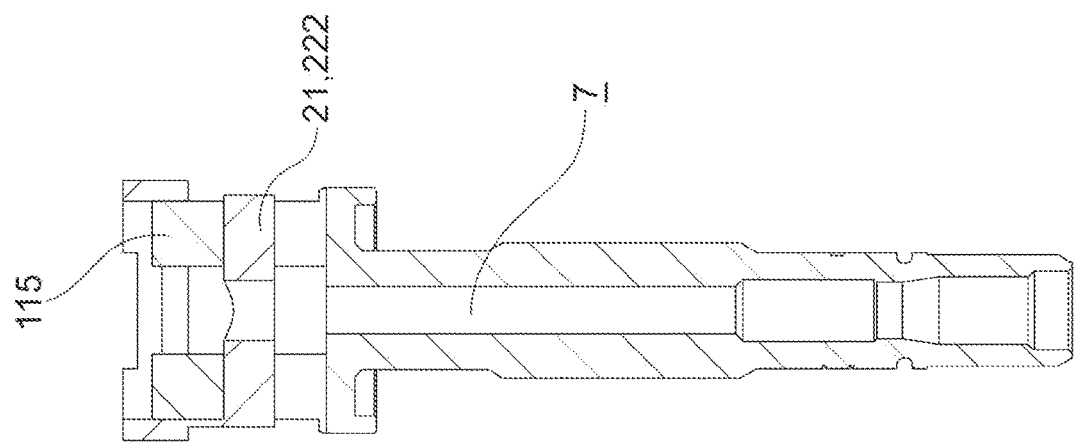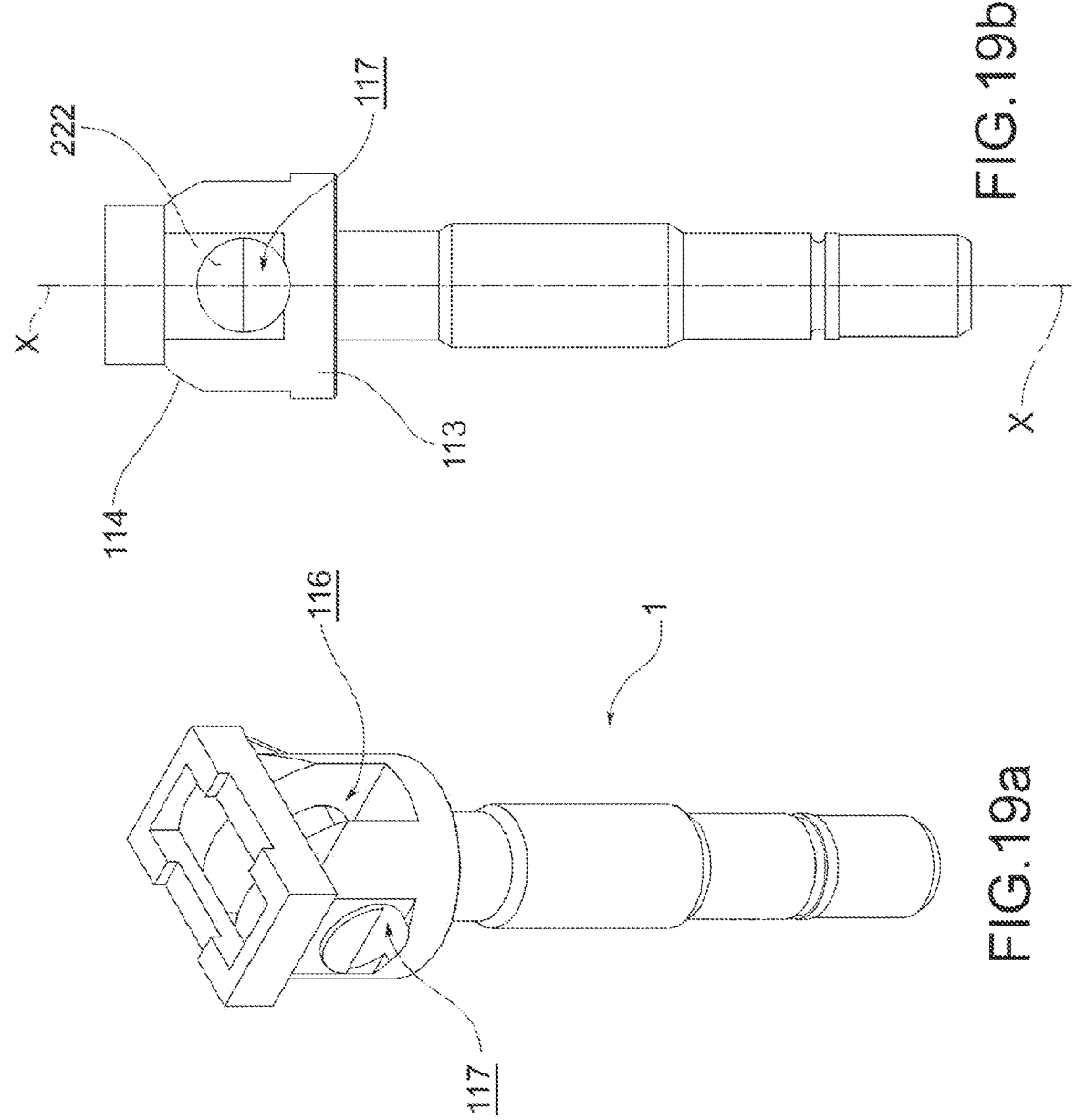

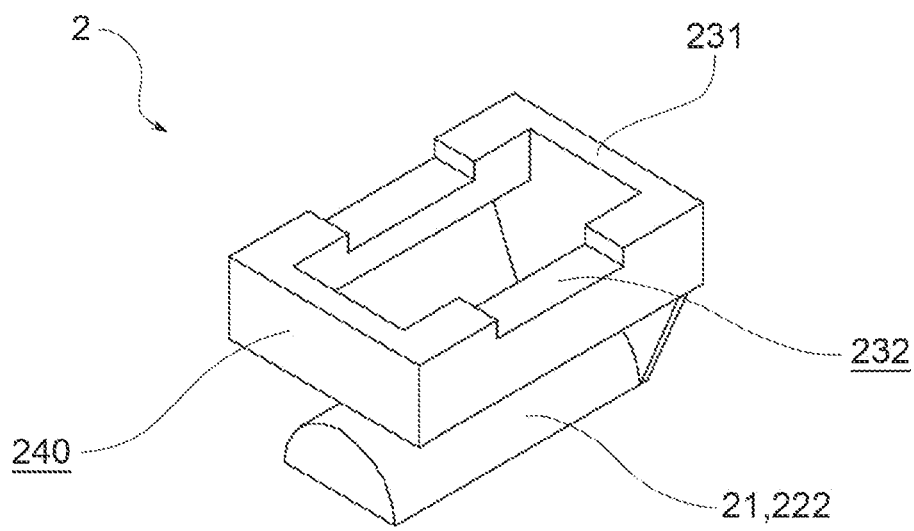
FIG.20a
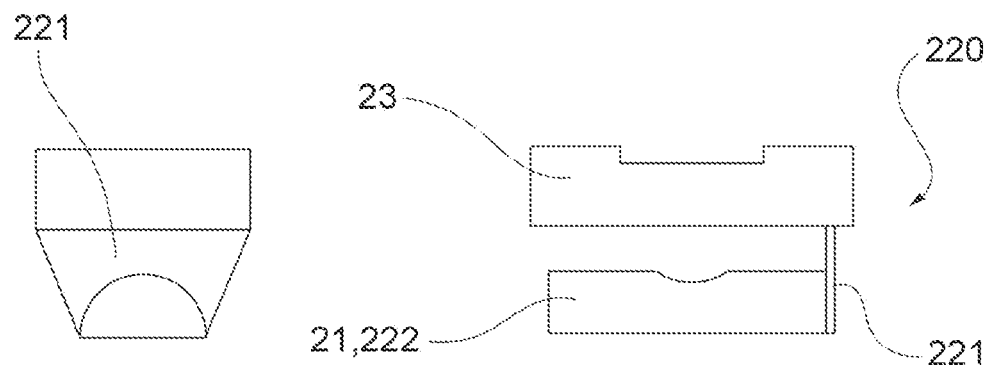
FIG.20b
FIG.20c
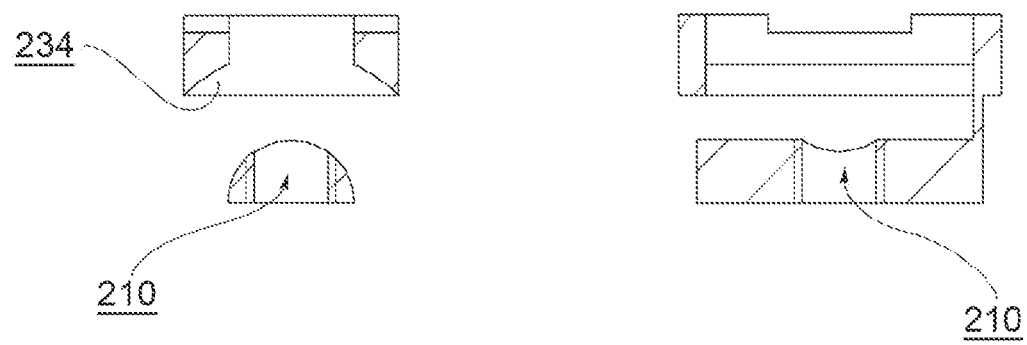
FIG.20d
FIG.20e

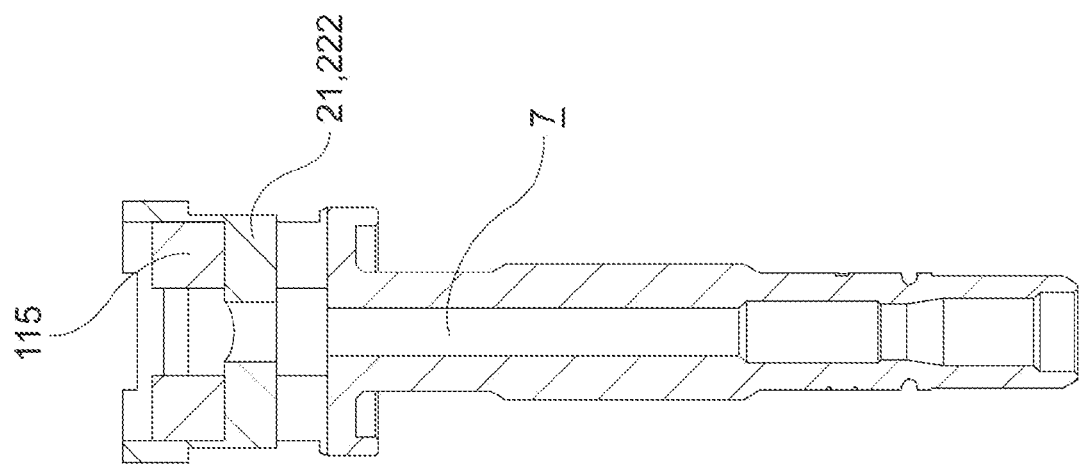
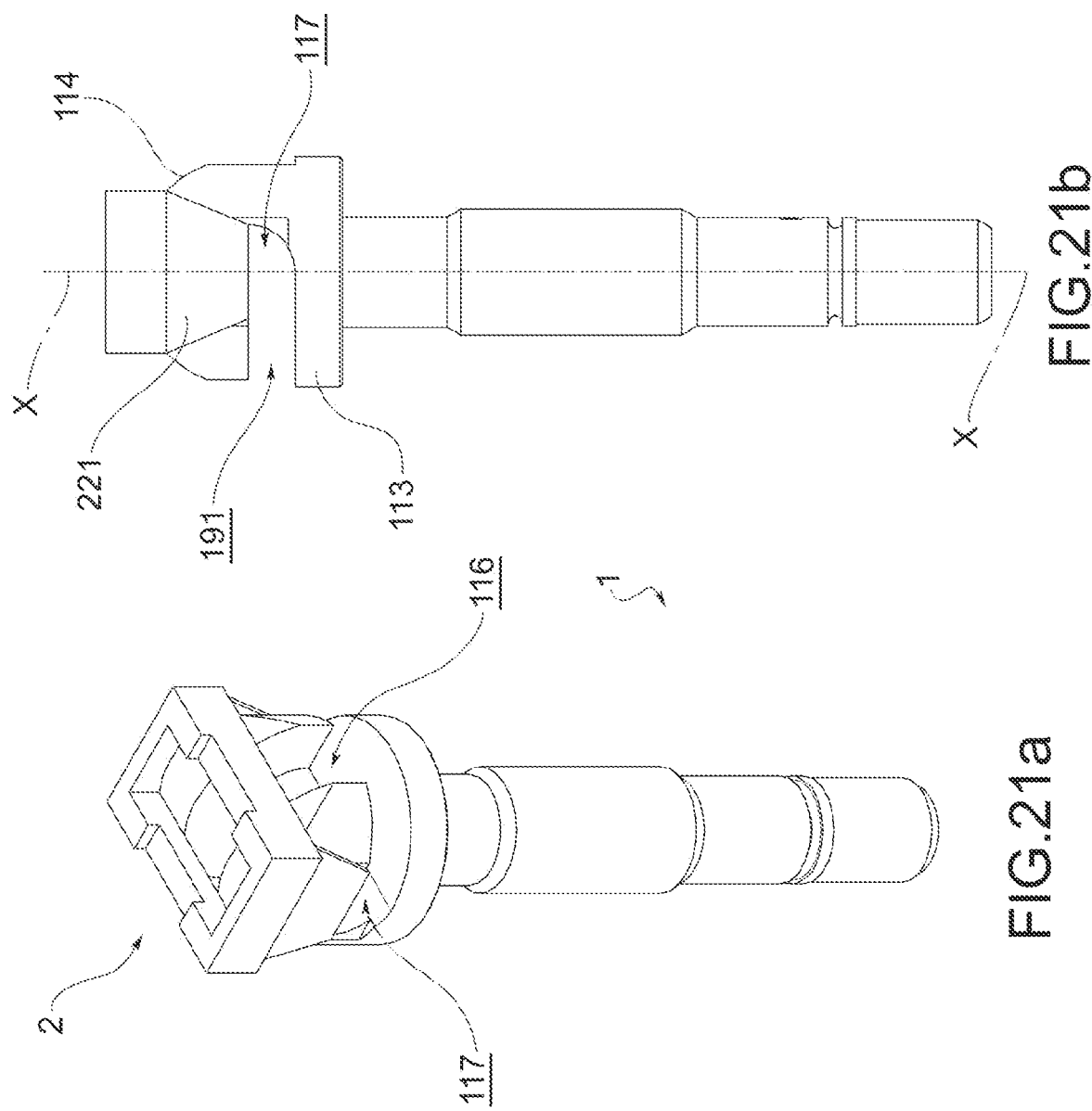
FIG.21a  FIG.21b  FIG.21c

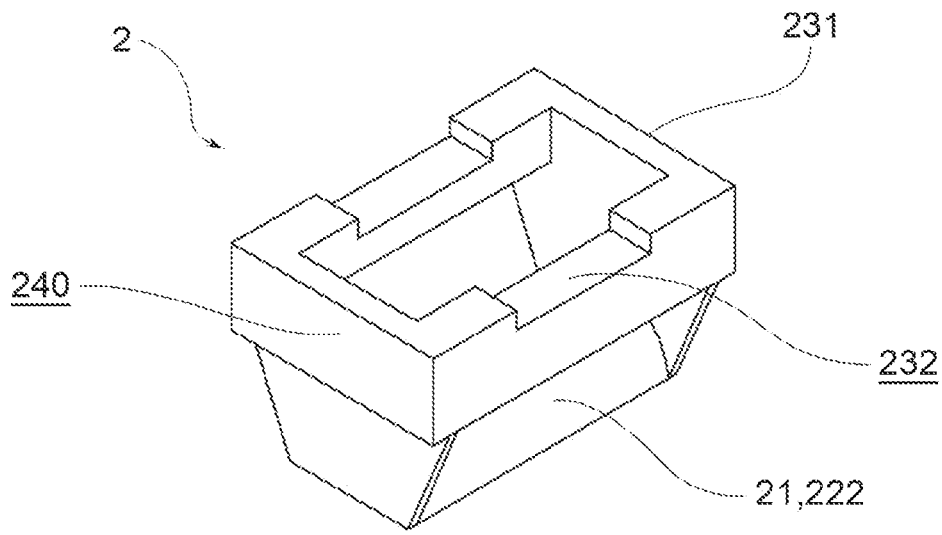
FIG.22a
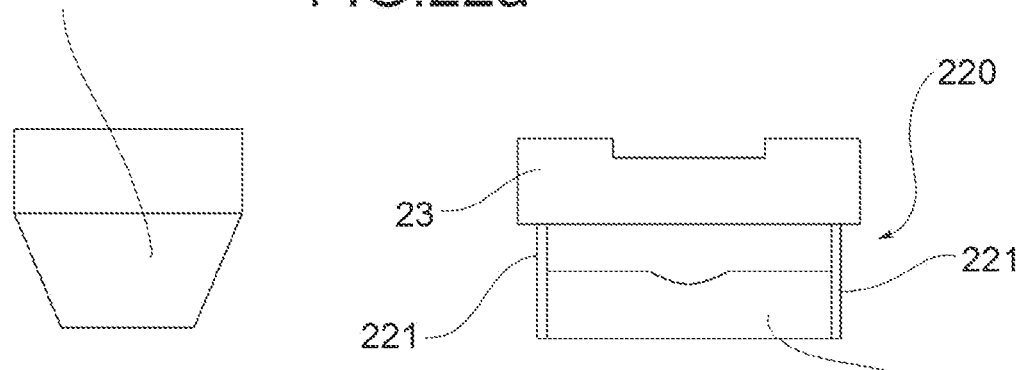
FIG.22b
FIG.22c
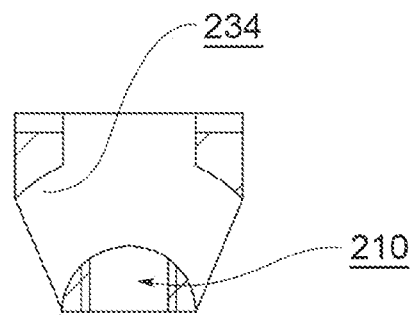
FIG.22d
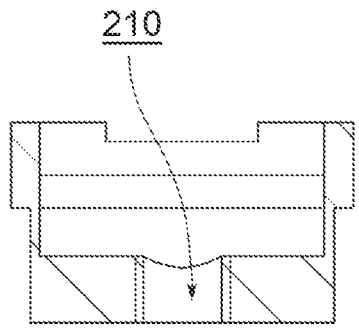
FIG.22e

TIRE INFLATION VALVE EQUIPPED WITH ADJUSTING SYSTEM FOR A TPMS SENSOR

FIELD OF THE INVENTION

The present invention relates to the sector of road wheel tire inflation valves, in particular for vehicles, where the term vehicles generally refers to motor vehicles, vans, trucks, motorcycles or, in general, road transport means.

More in detail, the invention relates to a valve of the clamp-in type, with controlled tightening, designed to be used in the field of Tire Pressure Monitoring System technology (TPMS), in which electronic sensors for detecting and transmitting certain operating parameters of the tires, in particular pressure, but also temperature, for example, are directly mounted on the valve itself and the valve is fastened to the wheel by a hole made in the rim.

BACKGROUND OF THE INVENTION

The metal valves of the clamp-in type generally consist of a shaped head, usually cylindrical or hemispherical or polygonal, which is associated with a TPMS sensor, and of an elongated stem (or shank) which allows tire inflation/deflation operations (by a suitable inner valve) and fastening of the valve itself to the wheel rim by suitable screw locking means.

In the example of the Figures, the stem 8 has a straight course; in a different embodiment the stem has curvatures or folds.

In the sector of inflation valves which may be associated with a TPMS, there is a need to have different types of valves available, depending on the shape, material and thickness of the rim, the thickness, position and diameter of the hole for inserting the valve, just to name a few.

Furthermore, while the use of a TPMS is mandatory for motor vehicles, for trucks the sensor is still considered an accessory, although very advantageous in terms of safety and efficiency (regular wear of the tire, possibility of traveling more kilometers, less frequent tire retreads, cost and emission reductions). In the near future, the use of the TPMS will also become mandatory for trucks.

With particular reference to truck tire inflation valves, many types exist depending on the tire and the related rim, and on the part of the vehicle (tractor or trailer) mounting the tire. Furthermore, such valves must allow access to the inflation systems even in complex situations, such as in the case of inner or twin wheels. Therefore, there are more types of valves for trucks than for motor vehicles. Such valves, therefore, have different types of "feet" (areas of the seal and of the threaded portion for the nut), and very variable lengths. They may have one or more folds in the shank area (also called "shaft").

Although such valves are now standardized, the introduction of the TPMS sensor leads to new and complex variables to be managed, such as the need to have a dedicated space for the valve head and for the TPMS sensor which must be oriented depending on the shape of the rim, a dedicated space to tighten the sensor during assembly, without forgetting safety requirement of the sensor against possible impacts when mounting the tire on the rim.

In the sector of tire inflation valves for vehicles, and in particular for trucks, the need to have a valve and a relative adjustable valve-sensor system which may adapt to different situations of use is therefore felt.

SUMMARY OF THE INVENTION

It is the object of the present invention to provide a tire inflation valve for vehicles, and in particular for trucks, equipped with a system for adjusting the position of the TPMS sensor.

Such object is achieved by a valve with an adjustable insert, a valve, an adjustable insert and a valve-sensor system as described and claimed herein. Embodiments of the valve according to the present invention are also described.

Further features and advantages of the present invention will be more comprehensible from the following description of a preferred embodiment thereof given by way of non-limiting examples.

BRIEF DESCRIPTION OF THE FIGURES

FIGS. 5A and 5B show a valve in accordance with the present invention equipped with a protective cap for the head, in a further alternative embodiment;

FIGS. 6A and 6B show a valve in accordance with the present invention, in an alternative embodiment in which the head may be separated from the shank;

FIGS. 7A to 8J show in detail a system for adjusting the position of the TPMS sensor of the valve in accordance with the present invention, in accordance with a single-component alternative embodiment, respectively:

FIG. 7A is a top axonometric view;
FIG. 8J is a sectional view along the plane J;

FIGS. 9 to 13C show in detail a system for adjusting the position of the TPMS sensor of the valve in accordance with the present invention, in accordance with a two-component alternative embodiment, respectively:

FIG. 9 is a top axonometric view of the assembly;
FIG. 10A is a bottom view of the assembly;
FIG. 11 is an exploded view of the adjustment system of FIG. 9;
FIG. 12 is a top view of the external component, with indication of the section planes C and D;

FIG. 13C is a sectional view of the external component along the plane D;

FIGS. 14 to 21 show in detail a system for adjusting the position of the TPMS sensor of the valve in accordance with the present invention, in accordance with a further two-component alternative embodiment, respectively:

FIG. 14 is a top axonometric view of the assembly;

FIG. 15A is a bottom view of the assembly;

FIG. 16 is an exploded view of the adjustment system of FIG. 16A;

FIG. 17 is a top view of the external component, with indication of the section planes R and P;

FIG. 18P is a sectional view of the external component along the plane P;

FIG. 18R is a sectional view of the external component along the plane R;

FIGS. 19A to 20E show a valve in accordance with the present invention, in a further alternative embodiment, with a single-component system for adjusting the position of the TPMS sensor, respectively:

FIG. 19A is a top axonometric view of the valve;

FIG. 19B is a side view of the valve;

FIG. 19C is a side sectional view of the valve;

FIG. 20A is an axonometric view of the adjustment system;

FIG. 20B is a side view of the adjustment system;

FIG. 20C is a front view of the adjustment system;

FIG. 20D is a side sectional view of the adjustment system;

FIG. 20E is a front sectional view of the adjustment system;

FIGS. 21A to 22E show a valve in accordance with the present invention, in a still further alternative embodiment, with a single-component system for adjusting the position of the TPMS sensor, respectively:

FIG. 21A is a top axonometric view of the valve;

FIG. 21B is a side view of the valve;

FIG. 21C is a side sectional view of the valve;

FIG. 22A is an axonometric view of the adjustment system;

FIG. 22B is a side view of the adjustment system;

FIG. 22C is a front view of the adjustment system;

FIG. 22D is a side sectional view of the adjustment system;

FIG. 22E is a front sectional view of the adjustment system; and

DETAILED DESCRIPTION

Figure 1:
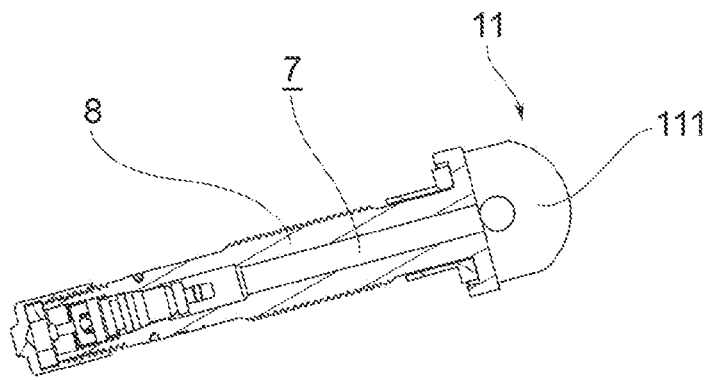
FIGS. 1 and 2 show a sectional view of a valve in accordance with the present invention, in an alternative embodiment in which the head is in one piece with the shank, respectively with (FIG. 2) and without (FIG. 1) the system for adjusting the position of the TPMS sensor.
Figure 2:
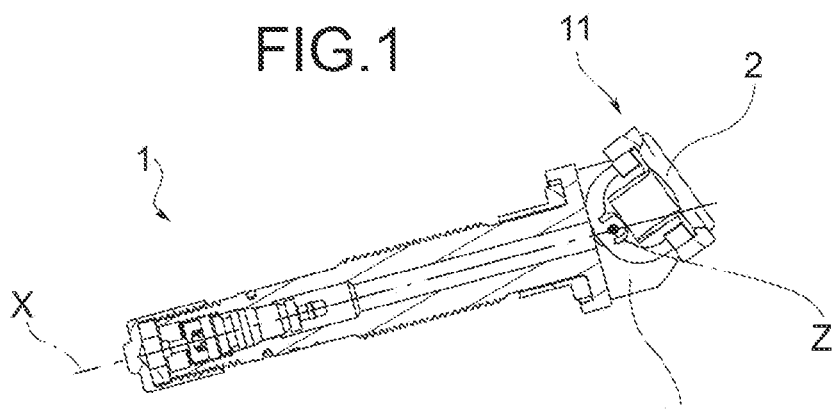
Figure 3A:
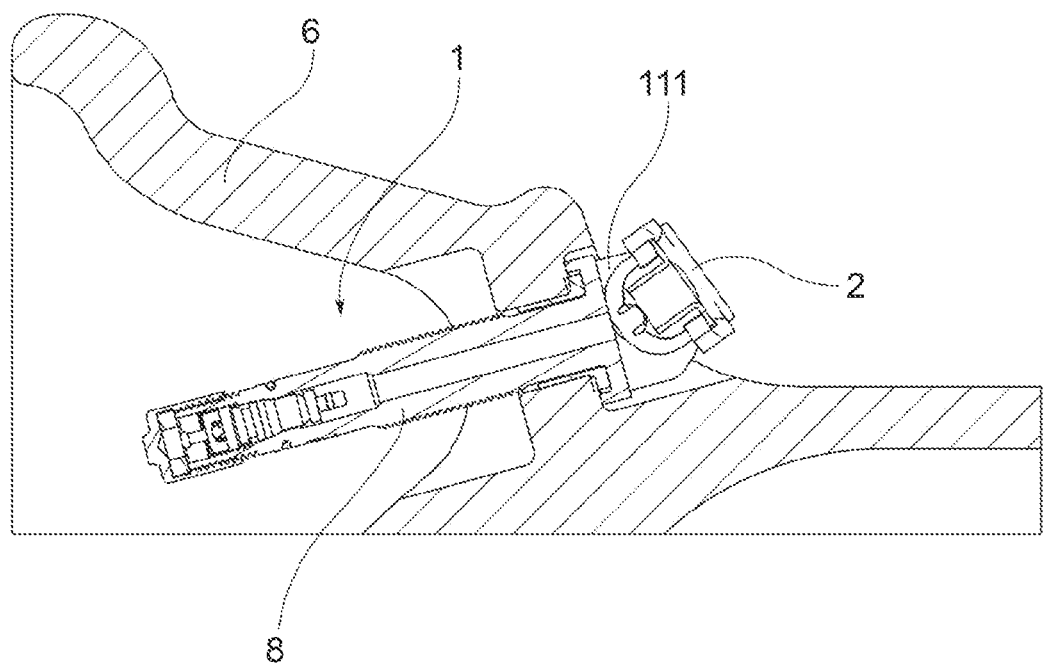
FIGS. 3A to 3D show the steps for assembling a valve in accordance with the present invention and for assembling the respective TPMS sensor, positioning of the valve in the hole of the rim (3A), tightening of the valve on the rim (3B), positioning and adjustment of the TPMS sensor on the head of the valve (3C), and tightening of the TPMS sensor on the valve, respectively.
Figure 3B:
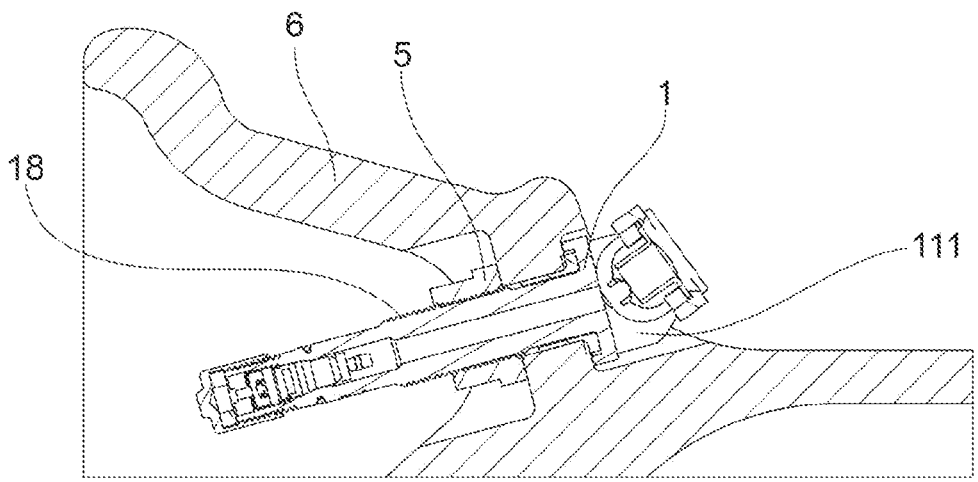
Figure 3C:
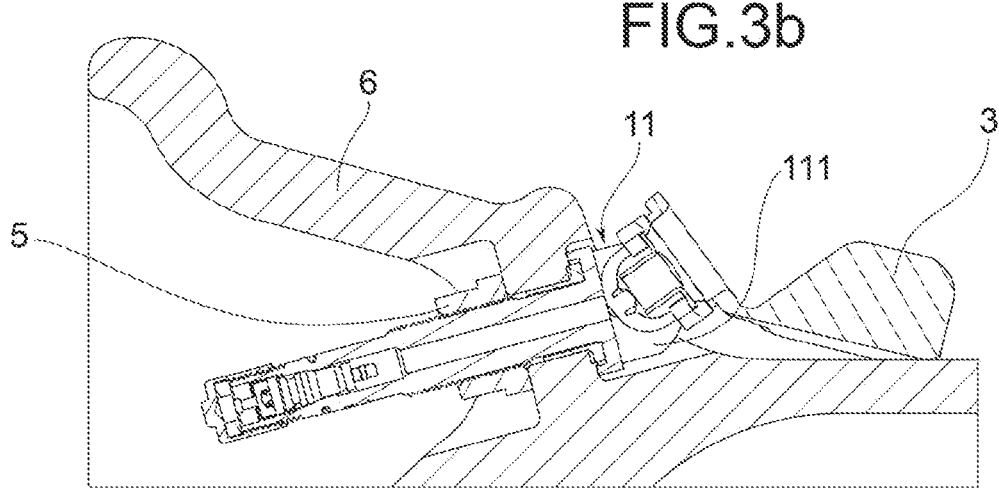
Figure 3D:
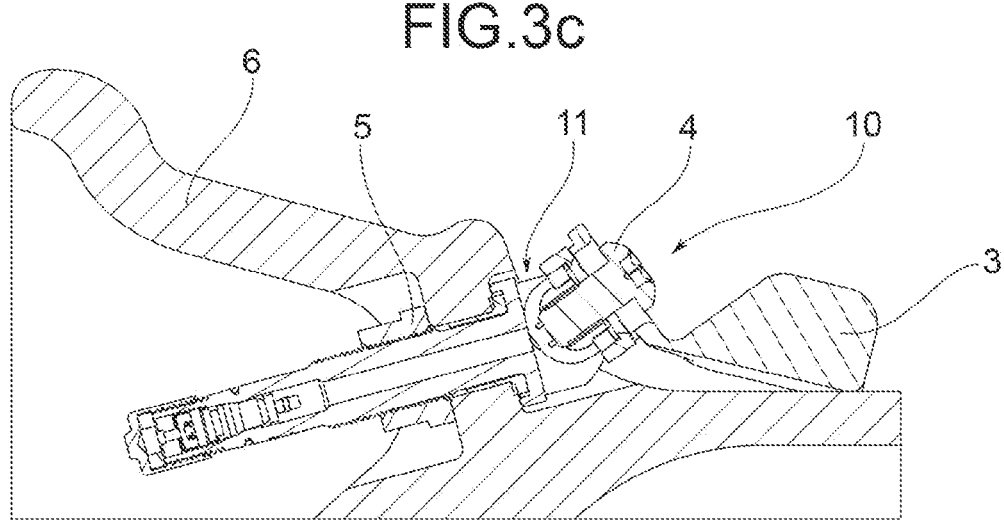

In the above Figures, identical or similar elements are indicated with the same reference numerals.

With reference to the above Figures, 1 overall indicates a vehicle tire inflation valve (hereinafter valve 1) equipped with a system for adjusting the position of the TPMS sensor, in accordance with the present invention.

The valve 1 may be made of metal or plastic, of the clamp-in type, for inflating tires, and is suitable for being stably associated with a sensor 3 for TPMS technology. The valve 1 may also be used without the sensor 3.

With particular reference to FIGS. 3A to 3D, the step of positioning (3A) and fastening (3B) the valve 1 and the step of positioning (3C) and fastening (3D) the relative sensor 3 on a rim 6 of a wheel of a motor vehicle to form a valve-sensor unit 10 are shown. The sensor 3 is positioned tangential to the rim 6 (inside the air chamber delimited by the relative tire, not shown), while the valve 1 protrudes externally with respect to the rim 6 and is stably fastened thereon by a locking nut 5 suitable for being screwed onto a thread 18 provided on the stem 8 of the valve 1.

In order to stably associate the two components, both the valve 1 and the sensor 3 are crossed by a connection element 4, for example, a screw or a pin.

The valve 1 develops along a longitudinal axis X and comprises a stem 8 and a head 11.

In the alternative embodiment of FIG. 6B the valve 1 is made in one piece, that is to say the stem 8 and the head 11 may not be separated from each other. In the alternative embodiment of FIG. 6A, the stem 8 and the head 11 are different and separate elements, connectable to each other by connection means 9, for example a screw, to make the valve 1.

The valve 1 in accordance with the present invention comprises, at the head 11, a means for adjusting the position of the TPMS sensor. The head 11 of the valve 1 is itself a means for adjusting the position of the TPMS sensor.

In particular the head 11 comprises a head body 111 connected (FIG. 6B) or connectable (FIG. 6A) to the stem 8, and an adjustable insert 2 connectable to the sensor 3. The adjustable insert 2 may be hinged to the head body 111 so as to rotate with respect thereto about the rotation axis Z.

The head body 111 is convex, for example, hemispherical, cylindrical or elliptical. In the example of FIG. 1, the head 11 is hemispherical; in the example of FIG. 19A it is cylindrical.

The head body 111 is axially drilled, i.e., the channel 7 present inside the stem 8 opens up at the head 11.

As shown in FIGS. 6A and 6B, the head body 111 has a substantially flat lower portion 113 from which a substantially hemispherical upper portion 114 develops.

The upper portion 114 comprises a central groove 116 extending along a horizontal axis Y. The central groove 116 divides the upper portion 114 of the head body 111 into two side portions 115 facing each other. The central groove 116 constitutes the seat in which the adjustable insert 2, or at least a part thereof, is rotatably inserted.

Both side portions 115 are equipped with a radial hole 117, a through hole or a blind hole, which extends along a transverse axis Z. The radial holes 117 face each other. The radial holes 117 constitute the rotating locking seats of the adjustable insert 2 or of at least a part thereof.

The upper portion 114 comprises at least one pair of side grooves 118, each on an outer face of the side portions 115, which may be used as a holder for a tool, such as a wrench.

Figures 4A, 4B:
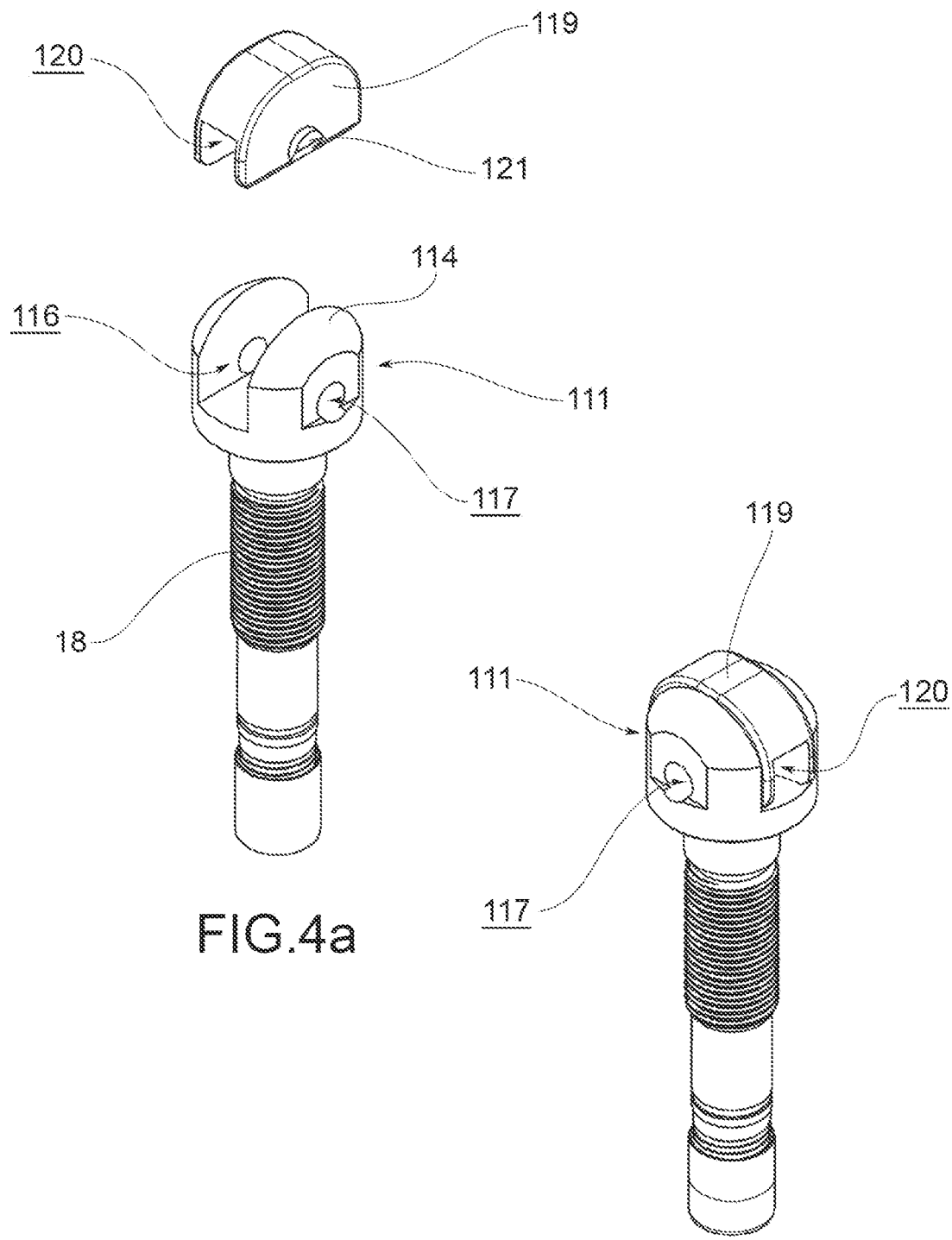
FIGS. 4A and 4B show a valve in accordance with the present invention equipped with a protective cap for the head, in an alternative embodiment.
Figure 7A:
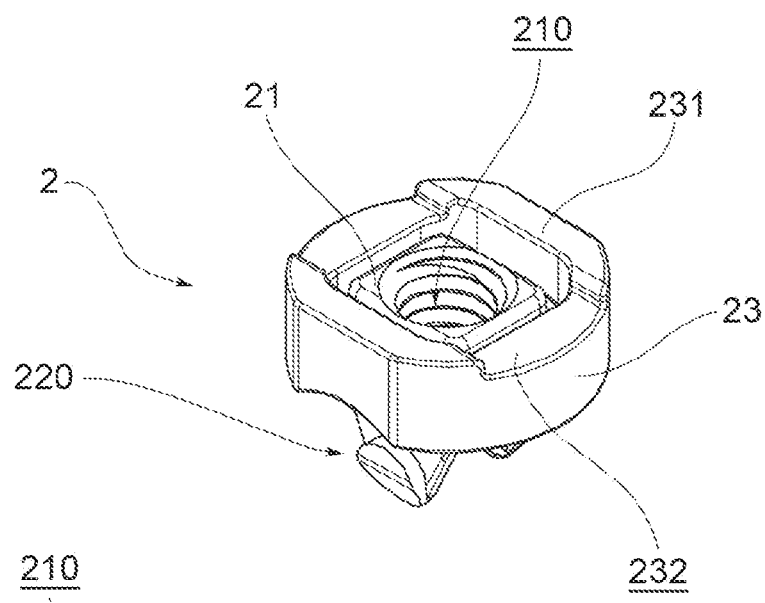
Figure 7B:
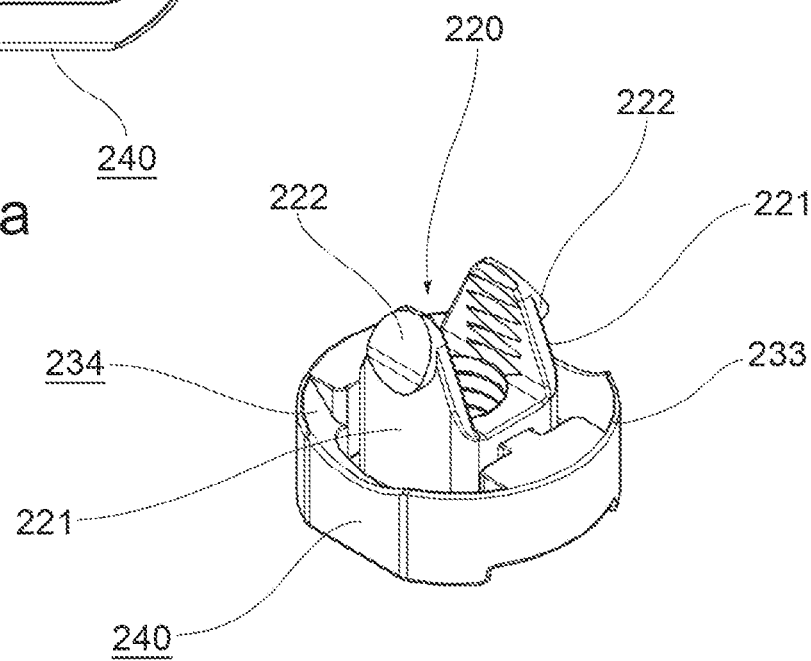
FIG. 7B is a bottom axonometric view.

Preferably, the valve 1 further comprises a cap 119 to cover the head body 111, to protect the tire during the assembly of the valve 1. In an embodiment shown in FIG. 4A, the cap 119 is insertable in the central groove 116 to complete the hemispherical upper portion 114 (4B). In a further embodiment shown in FIG. 5A, the cap 119 is hemispherical and fittable to cover, at least partially, the hemispherical upper portion 114 (5B).

Preferably, the cap 119 comprises at least one pair of protruding tabs 121, insertable in suitable seats of the head body 111, for example, in the radial holes 117, to facilitate fastening thereof on the valve 1.

Preferably, the cap 119 comprises at least one recess 120 in which to insert a tool, for example a screwdriver, to facilitate removal thereof from the head body 111 of the valve 1.

FIGS. 7A to 22E show some embodiments of the adjustable insert 2 which may be hinged to the head body 111, in accordance with the present invention.

The adjustable insert 2 comprises an inner body 21 equipped with a central seat 210 for the insertion of the connection element 4 (to connect the valve 1 and the sensor 3) and of an engagement portion 220 to allow connection thereof with the head body 111. Preferably, the central seat 210 is a threaded or self-tapping hole.

In the alternative embodiments relating to FIGS. 7A to 18R, the engagement portion 220 is inserted into the radial holes 117 from the inside of the central groove 116 made in the head body 111.

In such embodiments, the engagement portion 220 comprises a pair of flexible legs 221, suitable for elastically deforming (moving closer) to allow the at least partial insertion of the adjustable insert 2 inside the central groove 116 made in the head body 111. In such embodiment, the flexible legs 221 are arranged inside the head body 111.

Each flexible leg 221 is equipped, at the end, with a radial protrusion 222 suitable for fitting into the radial hole 117 to achieve the hinged connection between the adjustable insert 2 and the head body 111. The radial protrusion 222 protrudes towards the outside of the flexible leg 221, on the side opposite with respect to the central seat 210. The flexible legs 221 elastically deform, first by moving closer to allow the insertion of each radial protrusion 222 into the relative radial hole 117 of the head body 111, and then by moving away to keep each radial protrusion 222 inserted in the relative radial hole 117.

Figure 8A:
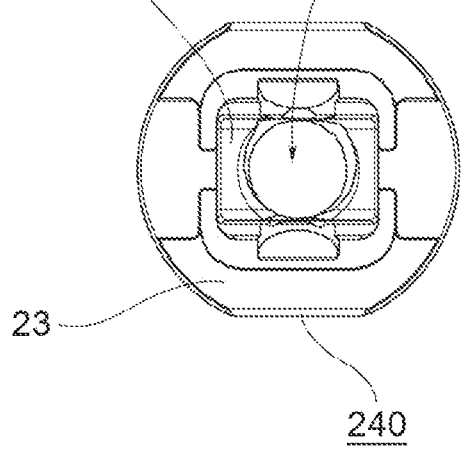
FIG. 8A is a bottom view.
Figure 8B:
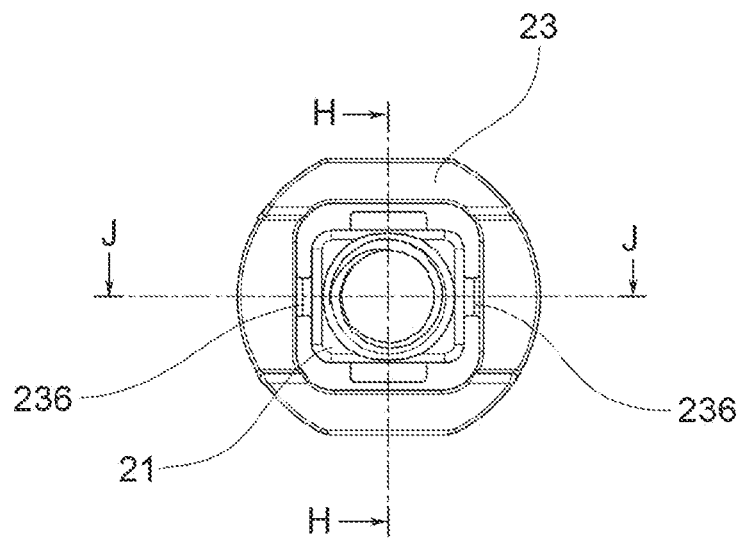
FIG. 8B is a top view, with indication of the section planes H and J.
Figure 8H:
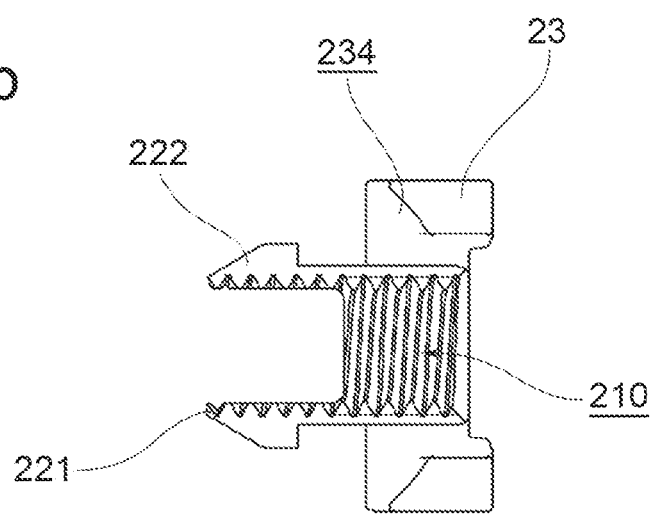
FIG. 8H is a sectional view along the plane H.
Figure 8J:
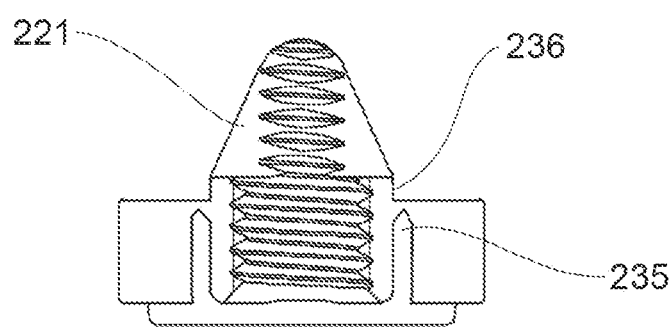
Figure 10B:
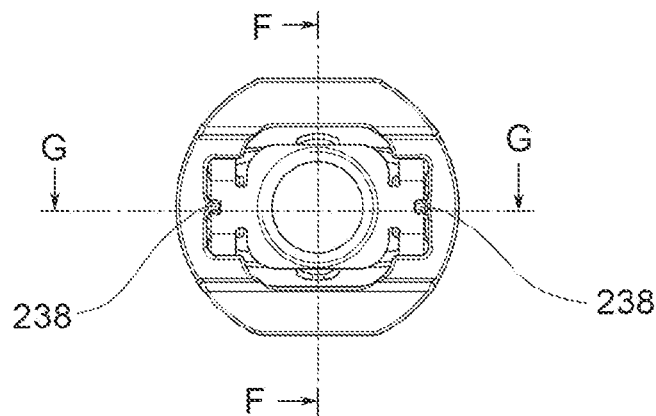
FIG. 10B is a top view of the assembly, with indication of the section planes H and J.
Figure 10F:
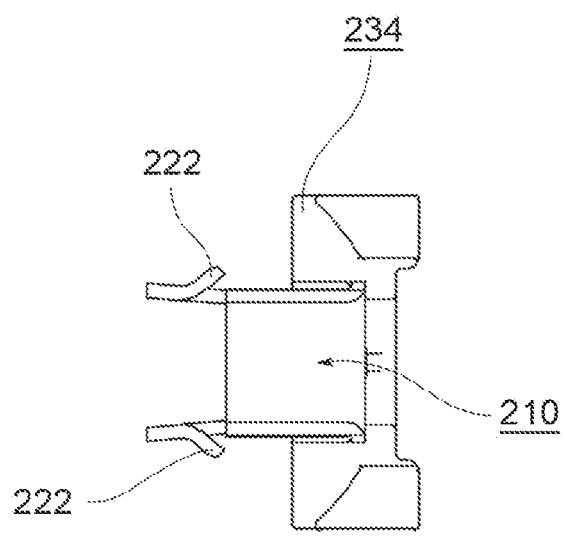
FIG. 10F is a sectional view of the assembly along the plane F.
Figure 10G:
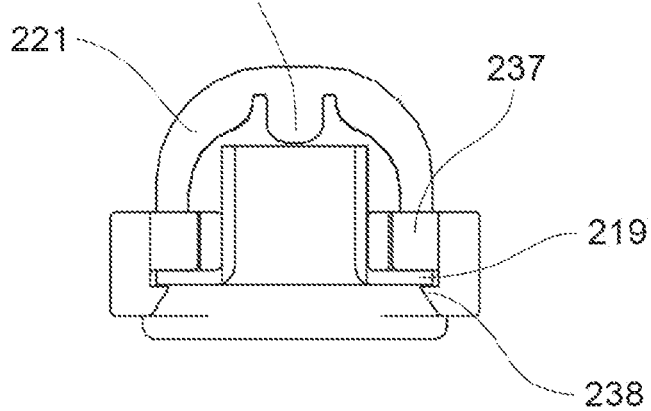
FIG. 10G is a sectional view of the assembly along the plane G.
Figure 12:
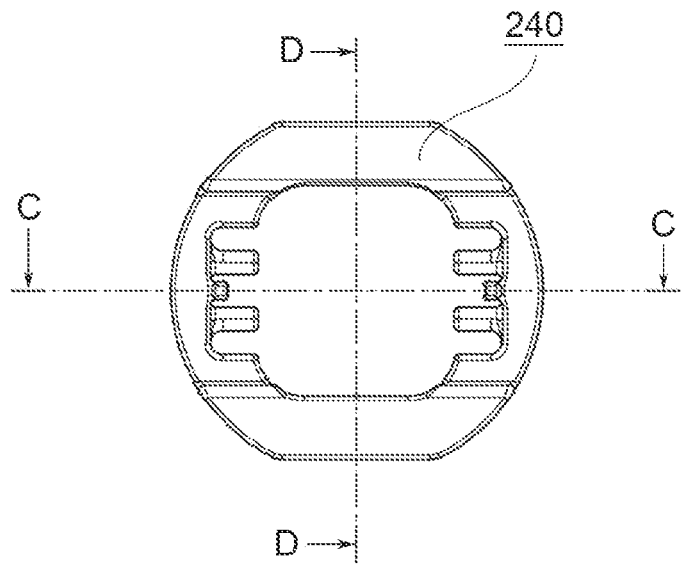
Figure 13D:
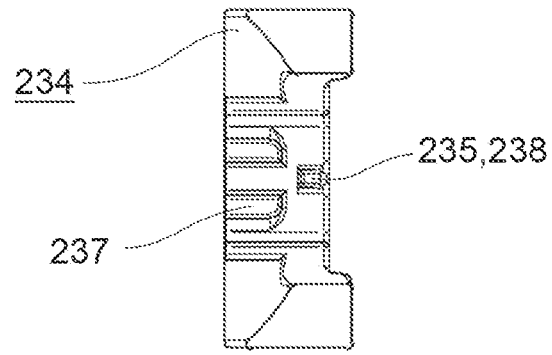
FIG. 13D is a sectional view of the external component along the plane D.
Figure 13C:
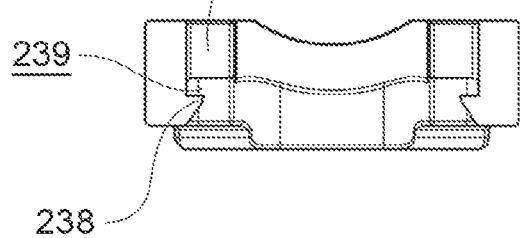
Figure 15B:
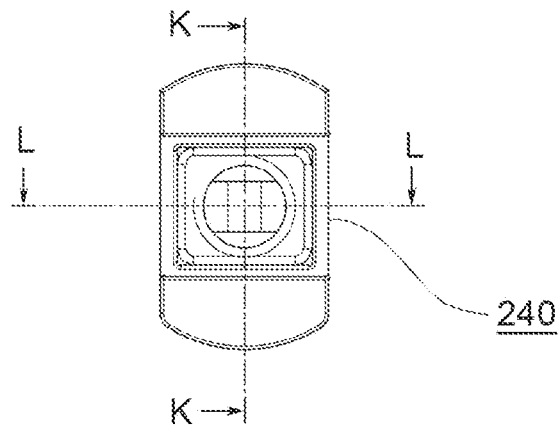
FIG. 15B is a top view of the assembly, with indication of the section planes K and L.
Figure 15K:
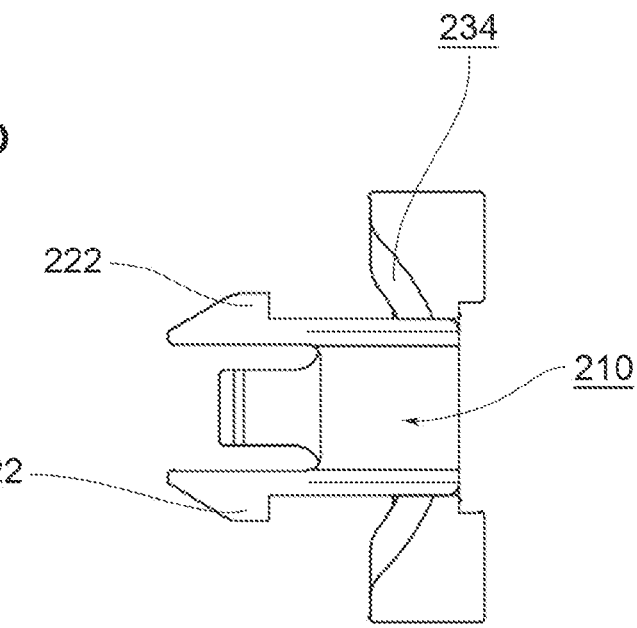
FIG. 15K is a sectional view of the assembly along the plane K.
Figure 15L:
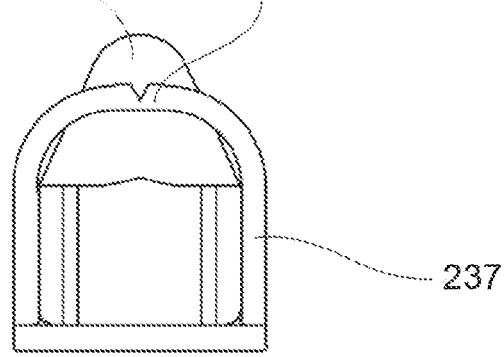
FIG. 15L is a sectional view of the assembly along the plane L.
Figure 23A:
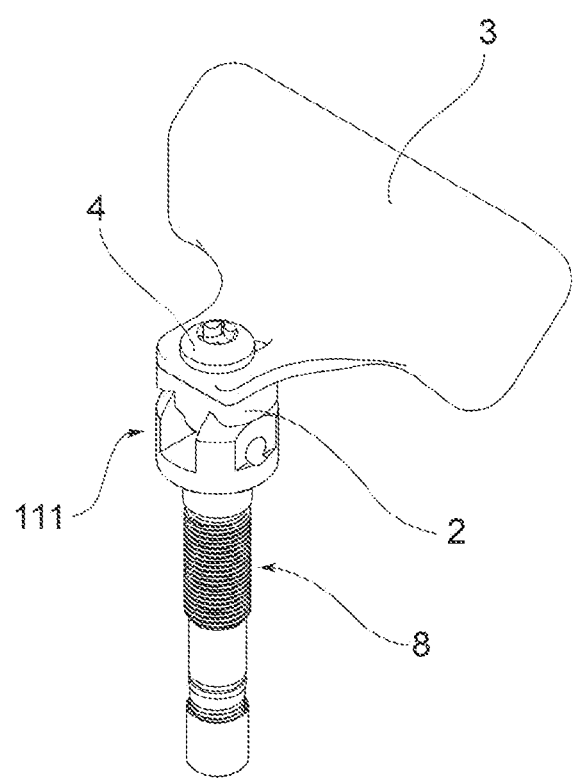
FIGS. 23A to 23C show the valve in accordance with the present invention equipped with a position adjustment system with the respective TPMS sensor mounted, in an axonometric view, in an axonometric sectional view and in a front sectional view.
Figure 23B:
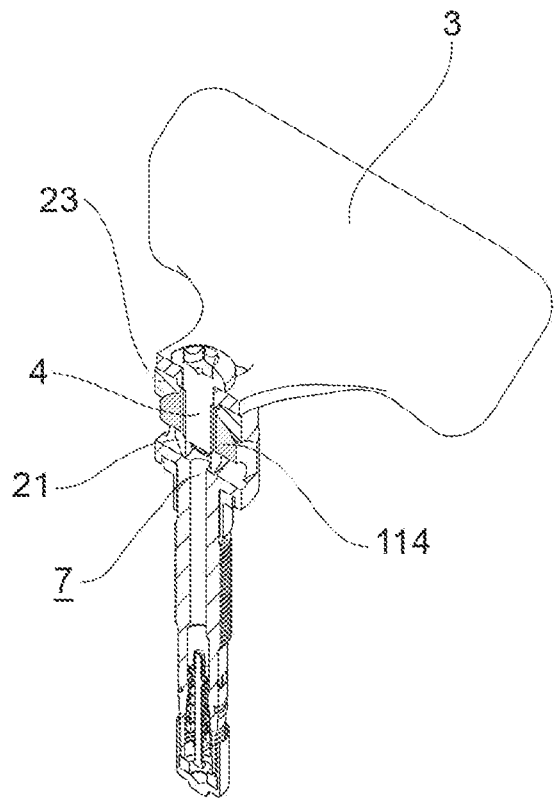
Figure 23C:
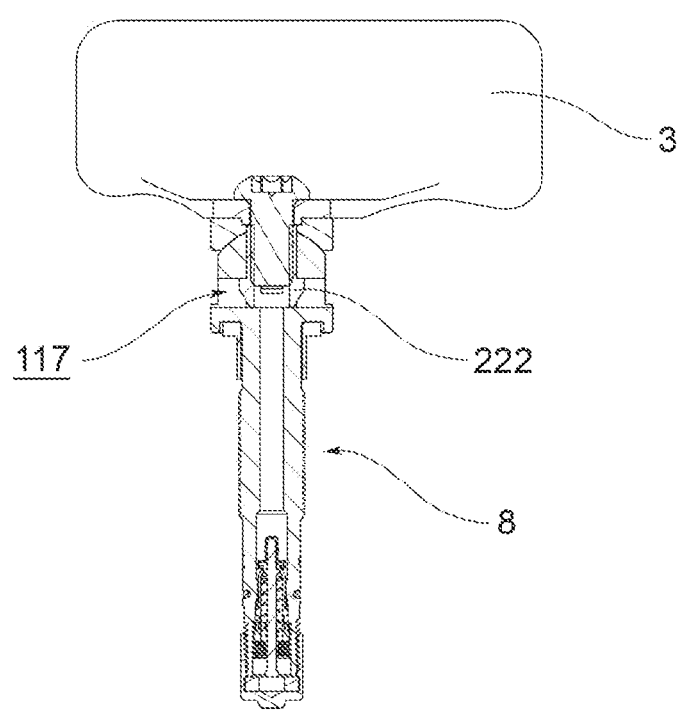

As it may be seen in FIGS. 8H, 10F and 17K, the central seat 210 ends before the radial protrusions 222 so that the connection element 4, inserted through the central seat 210, may protrude below it and act as a radial stop for the flexible legs 221, so that they may not move closer to each other. Thereby, each radial protrusion 222 remains firmly inserted into the relative radial hole 117 of the head body 111 to achieve the hinged connection of the adjustable insert 2. Once the connection element 4 is correctly inserted, the adjustable insert 2 is firmly hinged to the head body 111, as shown in FIG. 23C.

In the alternative embodiments relating to FIGS. 19A to 22E, the engagement portion 220 is inserted into the radial holes 117 from the outside of the central groove 116 made in the head body 111. Furthermore, in such embodiments, the radial protrusion 222 also forms the inner body 21 equipped with the central seat 210.

In the embodiment of FIG. 20A, the engagement portion 220 is inserted into the radial holes 117, laterally with respect to the valve 1. In such example, the engagement portion 220 comprises a flexible leg 221 equipped, at the end, with a radial protrusion 222 suitable for fitting into the radial holes 117 to achieve the hinged connection between the adjustable insert 2 and the head body 111. The radial protrusion 222 protrudes towards the inside of the flexible leg 221 and is long enough to simultaneously occupy both radial holes 117.

In the embodiment of FIG. 22A, the side portions 115 facing each other are equipped with an inlet port 191 suitable for allowing access of the engagement portion 220, which is inserted frontally with respect to the valve 1, into the radial holes 117. In such example, the engagement portion 220 comprises a pair of legs 221 connected to each other by a radial protrusion 222 suitable for fitting into the radial holes 117 to achieve the hinged connection between the adjustable insert 2 and the head body 111. The radial protrusion 222 is long enough to simultaneously occupy both radial holes 117.

In such embodiments (FIGS. 20A and 22A), the legs 221 are arranged outside the head body 111.

Preferably, the adjustable insert 2 further comprises an outer body 23. The inner body 21 is arranged in or connected with the outer body.

Preferably, the outer body 23 comprises a yielding portion 235, obtained, for example, with a pre-incision or as a thinning in the thickness of the piece (FIGS. 8J and 16B) or of the legs 221, or even as a protruding element or a tab (FIG. 13D), suitable for yielding in the event of excessive stress acting on the adjustable insert 2. Such yielding portion 235 acts as a guarantee seal or tamper proof to indicate that the adjustable insert 2 has already been used. Advantageously, the yielding portion 235 is arranged on the outer body 23 so that the tamper proof function does not compromise the fastening of the sensor 3 to the valve 1.

The outer body 23 is equipped with an upper surface 231 which defines a support surface for the sensor 3. Advantageously, the outer body 23 provides the valve 1 with a greater surface for supporting the sensor 3.

Preferably, the outer body 23 is equipped, at the upper surface 231, with an upper seat 232 configured to accommodate a corresponding possible protrusion on the bottom of the sensor 3, and to act as a constraint to the undesired rotation of the sensor.

Preferably, the outer body 23 is equipped, at the lower face 233, with at least one lower seat 234 configured to at least partially receive the hemispherical upper portion 114 of the head body 111.

Preferably, the outer body 23 is provided with at least one pair of side recesses 240 to facilitate the passage of a tool, such as a wrench for holding the head during tightening.

In the embodiment of FIGS. 7A to 8J and 19A to 22E, the adjustable insert 2 is a single piece, and therefore the outer body 23 and the inner body 21 are made in one piece. In such embodiment, the adjustable insert 2 is preferably made of plastic material.

In the embodiment of FIGS. 7A to 8J, the inner body 21 is substantially a parallelepiped crossed by a threaded hole which acts as a central seat 210 for screwing the connection element 4. A pair of legs 221 facing each other, each preferably triangular in shape, extends downwards from two opposite sides of the inner body 21. Each leg 221 is equipped with a radial outer protrusion 222 for the hinged connection between the adjustable insert 2 and the head body 111. Preferably, also the inner face of the legs 221 is at least partially threaded and is the continuation of the central seat 210 for the connection element 4. The outer body 23 is substantially cylindrical and surrounds the inner body 21. The outer body 23 is connected to the inner body 21 by a pair of bridges 236. Taking the inner body 21 as reference, the bridges 236 are arranged on the two opposite free sides of the inner body 21. The bridges 236, in addition to connecting the outer body 23 to the inner body 21, are also the yielding portions 235 which act as a tamper proof to indicate whether the adjustable insert 2 has already been used. The outer body 23 is further equipped with the upper seat 232 to accommodate any protrusion on the bottom of the sensor 3, with the lower seat 234 to accommodate the hemispherical upper portion 114 of the head body 111, and with the side recesses 240 to facilitate the passage of a tool.

In the embodiment of FIGS. 20A to 20E, the inner body 21 is substantially a parallelepiped crossed by a hole which acts as a central seat 210 for screwing the connection element 4. On one side of the inner body 21, a leg 221, preferably triangular in shape, extends downwards. The leg 221 is equipped with a radial protrusion 222 for the hinged connection between the adjustable insert 2 and the head body 111. The radial protrusion 222 is equipped with a threaded hole which is the continuation of the central seat 210 for the connection element 4. The outer body 23 is substantially parallelepiped and is above the inner body 21. The outer body 23 is connected to the inner body 21 by the leg 221. The outer body 23 is further equipped with the upper seat 232 to accommodate any protrusion on the bottom of the sensor 3, with the lower seat 234 to accommodate the hemispherical upper portion 114 of the head body 111, and with the side recesses 240 to facilitate passage of a tool.

In the embodiment of FIGS. 22A to 22E, the inner body 21 is substantially a parallelepiped crossed by a hole which acts as a central seat 210 for screwing the connection element 4. A pair of legs 221 facing each other, each preferably triangular in shape, extends downwards from two opposite sides of the inner body 21. The legs 221 are connected by the radial protrusion 222 for the hinged connection between the adjustable insert 2 and the head body 111. The radial protrusion 222 is equipped with a threaded hole which is the continuation of the central seat 210 for the connection element 4. The outer body 23 is substantially parallelepiped and is above the inner body 21. The outer body 23 is connected to the inner body 21 by the legs 221. The outer body 23 is further equipped with the upper seat 232 to accommodate any protrusion on the bottom of the sensor 3, with the lower seat 234 to accommodate the hemispherical upper portion 114 of the head body 111, and with the side recesses 240 to facilitate the passage of a tool.

In the embodiment of FIGS. 9 to 18R the adjustable insert 2 is two-component, and therefore the outer body 23 and the inner body 21 are different elements mechanically assembled.

Preferably, in the embodiment of FIGS. 9 to 13C, the outer body 23 is made of plastic material and the inner body 21 is made of metal. Advantageously, the fact that the inner body 21 is made of metal ensures a more resistant fastening between the valve 1 and the sensor 3.

In a further embodiment, the inner body 21 consists of different elements, made of plastic and/or metal, mechanically assembled.

In the embodiment of FIGS. 9 to 13C, the inner body 21 is substantially a cylinder crossed by a threaded or self-tapping hole which acts as a central seat 210 for screwing the connection element 4. A pair of legs 221, facing each other, each preferably U-shaped or C-shaped, extend downwards from two opposite sides of the inner body 21. Each leg 221 is equipped with a radial outer protrusion 222 for the hinged connection between the adjustable insert 2 and the head body 111. The outer body 23 is substantially cylindrical and surrounds the inner body 21. The outer body 23 is connected in an interlocking manner to the inner body 21 by abutment elements 237, 238. Preferably, the outer body 23 comprises, internally protruding from opposite sides, at least one pair of lower abutment elements 237 and one pair of top abutment elements 238 which define, between each other, a gripping seat 239 for an upper edge 219 of the inner body 21. Preferably, the top abutment element 238 is shorter than the lower abutment element 237 and is such as to allow the upper edge 219 of the inner body 21 to be inserted into the gripping seat 239 of the outer body 23 and prevent it from coming out. Taking the inner body 21 as a reference, the abutment elements 237, 238 are arranged at the two facing free sides of the inner body 21. The top abutment elements 238, in addition to allowing the interlocking between the outer body 23 and the inner body 21, are also the yielding portions 235 which act as a tamper proof to indicate whether the adjustable insert 2 has already been used. The outer body 23 is further equipped with the upper seat 232 to accommodate any protrusion on the bottom of the sensor 3, with the lower seat 234 to accommodate the hemispherical upper portion 114 of the head body 111, and with the side recesses 240 to facilitate the passage of a tool.

Preferably, in the example embodiment of FIGS. 14 to 18R, both the outer body 23 and the inner body 21 are made of plastic material.

In the example embodiment of FIGS. 14 to 18R, the inner body 21 is substantially a parallelepiped crossed by a self-tapping hole which acts as a central seat 210 for screwing the connection element 4. A pair of legs 221 facing each other, each, preferably, substantially triangular in shape, extends downwards from two opposite sides of the inner body 21. Each leg 221 is equipped with a radial outer protrusion 222 for the hinged connection between the adjustable insert 2 and the head body 111. The outer body 23 is substantially rectangular and surrounds the inner body 21. The inner body 21 is slidably inserted inside the outer body 23 and is held by abutment elements 237, 238. Preferably, the outer body 23 is equipped with a lower abutment element 237, preferably U-shaped or C-shaped, and with at least one pair of top abutment elements 238 which define, between each other, a gripping seat 239 for the inner body 21. The lower abutment element 237, in addition to allowing retention of the outer body 23, is also the yielding portion 235 which acts as a tamper proof to indicate whether the adjustable insert 2 has already been used. The outer body 23 is further equipped with the upper seat 232 to accommodate any protrusion on the bottom of the sensor 3, with the lower seat 234 to accommodate the hemispherical upper portion 114 of the head body 111, and with the side recesses 240 to facilitate passage of a tool.

Advantageously, the adjustable insert 2 is at least partially made of plastic material and acts as the sacrificial element of the valve-sensor unit 10 in the event of issues during the step of assembling the valve 1 on the tire: it is in fact preferable for the valve 1 to break, rather than the sensor 3, which is much more expensive. Furthermore, of the entire valve 1, it is preferable for the adjustable insert 2 to break, as it is more easily replaceable.

Advantageously, at least the outer body 23 of the adjustable insert 2 is made of plastic material and acts as the sacrificial element of the adjustable insert 2: it is in fact preferable for the outer body 23 to break, rather than the inner body 21, so as to always and in any case ensure that the sensor 3 is fastened to the valve 1.

It is an object of the present invention a tire inflation valve 1 associable with a TPMS sensor, having a longitudinal development axis X and comprising a stem 8 ending in a head 11 equipped with a head body 111. Such valve comprises an adjustable insert 2 associable with a TPMS sensor 3 by a connection element 4 and hinged to the head body 111 to rotate about a transverse axis Z and allow position adjustment of the sensor 3.

It is another object of the present invention a tire inflation valve associable with a TPMS sensor, having a longitudinal development axis X and comprising a stem 8 ending in a head 11 equipped with a head body 111. The head body 111 comprises two side portions 115 facing each other and each equipped with a radial hole 117 extending along the transverse axis Z, the holes 117 facing each other and configured to act as locking seats, in rotation, for an adjustable insert associable with a TPMS sensor.

It is a further object of the present invention an adjustable insert 2 for a tire inflation valve associable with a TPMS sensor, comprising an inner body 21 with a central seat 210 and an engagement portion 220 having at least one leg 221 equipped with a radial protrusion 222 insertable into the valve head to achieve a hinged connection between the valve and the sensor.

It is yet a further object of the present invention a valve-sensor system adaptable to different situations of use, comprising:
a tire inflation valve 1 according to the present invention, and
a TPMS sensor 3 associated with the adjustable insert 2 by a connection element 4,
in which the connection element 4 fastens the adjustable insert 2 to the head body 111.

Innovatively, a tire inflation valve for vehicles, and in particular for trucks, in accordance with the present invention is equipped with a system for adjusting the position of the TPMS sensor which allows to achieve a single head 11 suitable for all needs.

Advantageously, the valve according to the present invention, by virtue of the adjustable insert 2, allows to change the inclination of the TPMS sensor according to the different conditions of use.

Advantageously, the valve according to the present invention, by virtue of the adjustable insert 2, is suitable for many types of sensors and for different sensor accommodation models and allows several customizations.

Advantageously, the valve according to the present invention includes a head 11 shaped so as to leave free space for working tools, facilitating tightening on the rim and mounting of the TPMS sensor.

Advantageously, the valve according to the present invention is also suitable for applications without a TPMS sensor since the adjustable insert 2 is easily removable from the valve head 11.

Advantageously, by means of the valve according to the present invention, the TPMS sensor may also be applied in a second step.

Advantageously, the valve according to the present invention, by virtue of the presence of tamper proof elements, is capable of signaling whether a previous use or tampering has occurred.

Advantageously, the valve according to the present invention is compatible with both perforated and non-perforated, threaded or self-tapping connection elements 4 since the vent hole of the central channel 7 is positioned far from the connection element and so as not be obstructed thereby.

In order to meet contingent and specific needs, those skilled in the art may make several changes and variants to the valve described above, all contained within the scope of protection as described and claimed herein.

The invention claimed is:

1. A tire inflation valve associable with a tire pressure monitoring system (TPMS) sensor, having a longitudinal development axis and comprising:
a stem ending in a head equipped with a head body, and
an adjustable insert associable with the TPMS sensor by a connection element, and hinged to the head body to rotate about a transverse axis and allow position adjustment of the TPMS sensor,
wherein the adjustable insert comprises an inner body equipped with a central seat for insertion of the connection element and with an engagement portion to allow connection thereof with the head body.

2. The tire inflation valve of claim 1, wherein the engagement portion comprises at least one leg equipped with a radial protrusion insertable into a corresponding radial hole of the head body to achieve a hinged connection between the adjustable insert and the head body.

3. The tire inflation valve of claim 2, wherein the at least one leg is arranged outside or inside the head body.

4. The tire inflation valve of claim 1, wherein the adjustable insert comprises an outer body connected to the inner body, said outer body being made of plastic material.

5. The tire inflation valve of claim 4, wherein the outer body comprises at least one yielding portion acting as a tamper proof.

6. The tire inflation valve of claim 4, wherein the outer body comprises an upper surface that defines a support surface for the TPMS sensor, the outer body further comprising:
at least one upper seat configured to receive a bottom of the TPMS sensor,
at least one lower seat configured to at least partially receive the head body, and
at least one pair of side recesses.

7. The tire inflation valve of claim 4, wherein said inner body and said outer body are made in one piece of plastic material.

8. The tire inflation valve of claim 4, wherein said inner body and said outer body are different elements mechanically assembled, and wherein also the inner body is made of plastic material.

9. The tire inflation valve of claim 4, wherein said inner body and said outer body are different elements mechanically assembled, and wherein the inner body is made of metal.

10. The tire inflation valve of claim 8, wherein said inner body is kept in position inside the outer body by at least one lower abutment element and at least one top abutment element.

11. The tire inflation valve of claim 1, wherein the head body comprises two side portions facing each other and equipped each with a radial hole extending along the transverse axis, said radial holes facing each other and configured to act as locking seats, in rotation, of the adjustable insert or at least of a part thereof.

12. A tire inflation valve associable with a tire pressure monitoring system (TPMS) sensor, having a longitudinal development axis and comprising a stem ending in a head equipped with a head body,
wherein the head body comprises two side portions facing each other and each equipped with a radial hole extending along a transverse axis, said radial holes facing each other and configured to act as locking seats, in rotation, for an adjustable insert associable with the TPMS sensor, and
wherein the tire inflation valve further comprises a cap to protect the head body, said cap being locatable between the two side portions to complete a hemispherical upper portion of the head body, or fittable to cover a hemispherical upper portion of the head body.

13. A valve-sensor system adaptable to different situations of use, the valve-sensor system comprising:
   a tire inflation valve associable with a tire pressure monitoring system (TPMS) sensor, having a longitudinal development axis and comprising:
      a stem ending in a head equipped with a head body, and
      an adjustable insert associable with the TPMS sensor by a connection element, and hinged to the head body to rotate about a transverse axis and allow position adjustment of the TPMS sensor,
      wherein the adjustable insert comprises an inner body equipped with a central seat for insertion of the connection element and with an engagement portion to allow connection thereof with the head body, and
   a TPMS sensor associated with the adjustable insert by the connection element,
   wherein the connection element fastens the adjustable insert to the head body.

\* \* \* \* \*